(No Model.)　　　　　　　　　　　　　　　　2 Sheets—Sheet 1.
T. W. HUGO.
AUTOMATIC LUBRICATOR.
No. 360,157.　　　　　　　　Patented Mar. 29, 1887.
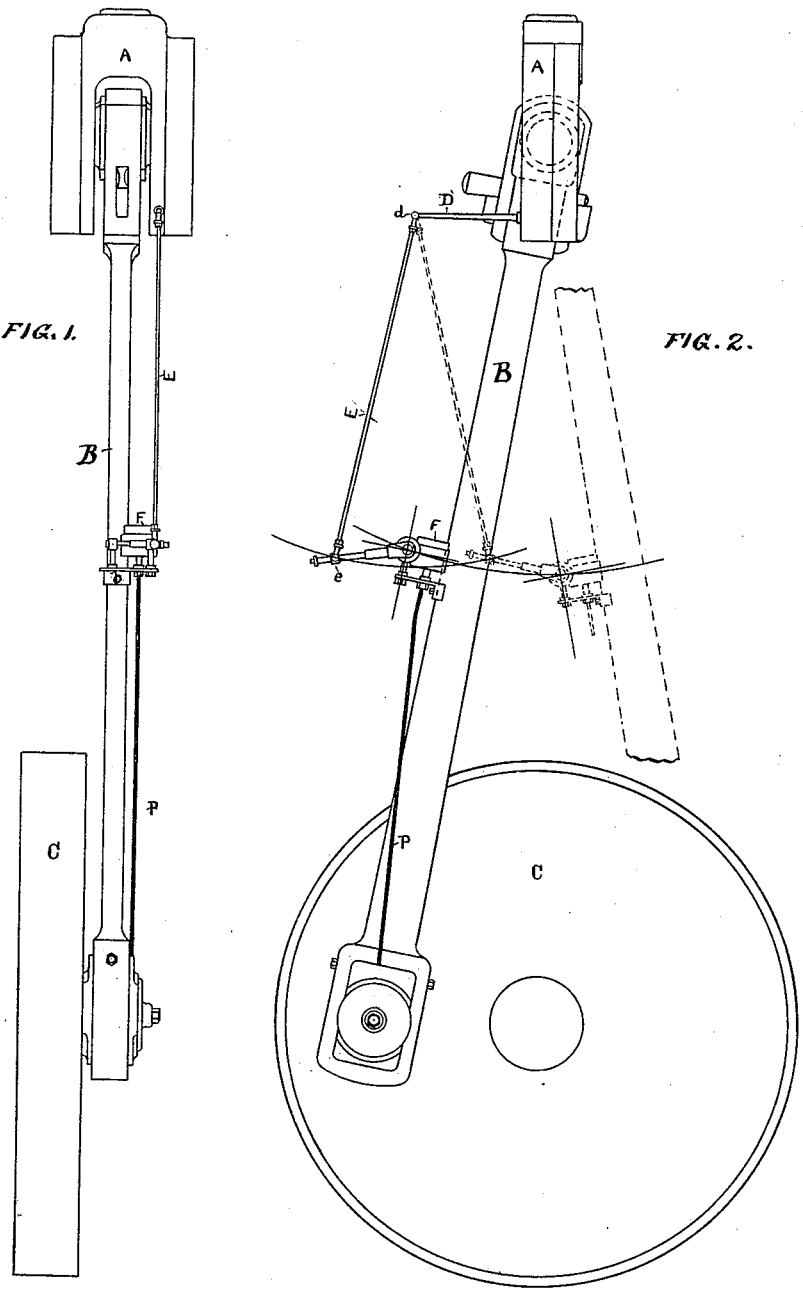
WITNESSES
C. L. Redfield
Emma F. Elmore
INVENTOR
Trevanion William Hugo
by Jas. F. Williamson
ATTORNEY (No Model.) 2 Sheets—Sheet 2.
T. W. HUGO.
AUTOMATIC LUBRICATOR.
No. 360,157. Patented Mar. 29, 1887.
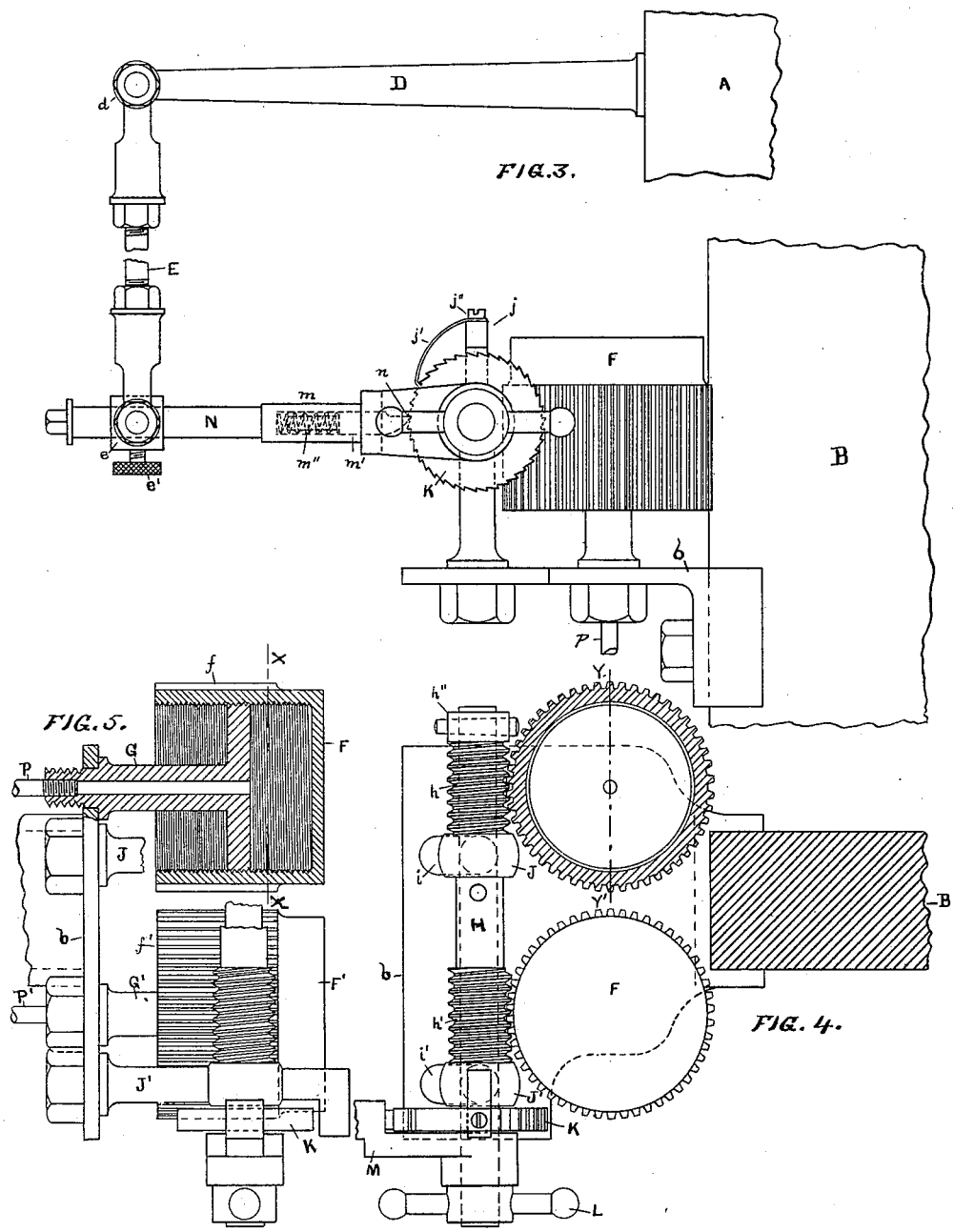
WITNESSES
C. L. Redfield
Emma F. Elmore
INVENTOR
Trevanion William Hugo
by Jas. F. Williamson
ATTORNEY

UNITED STATES PATENT OFFICE.

TREVANION WILLIAM HUGO, OF DULUTH, MINNESOTA, ASSIGNOR OF ONE-HALF TO N. FREDERICK HUGO, OF SAME PLACE.

AUTOMATIC LUBRICATOR.

SPECIFICATION forming part of Letters Patent No. 360,157, dated March 29, 1887.

Application filed November 4, 1886. Serial No. 217,958. (No model.)

*To all whom it may concern:*

Be it known that I, TREVANION WILLIAM HUGO, a citizen of the United States, and a resident of Duluth, county of St. Louis, State of Minnesota, have made a new and useful Improvement in Automatic Lubricators, of which the following is a specification.

My invention relates to automatic lubricators, and has for its object to force a constant supply of grease or other turgid lubricant wherever it is needed—as, for example, to the crank-pin or other similar moving parts of a steam-engine.

It consists of the peculiar device hereinafter described and claimed.

In the accompanying drawings, like letters referring to like parts throughout, Figure 1 is a plan view of my device in position as applied to the crank-pin of an ordinary engine. Fig. 2 is a side elevation of the same. Fig. 3 is a side elevation of the device and a part of the cross-head and connecting-rod when the latter is on a line with the cross-head and crank-shaft. Figs. 4 and 5 are details giving detached views of my device, showing the grease-cups and the means for forcing the grease out of the same, Fig. 4 being a view of the device when two cups are used, partly in plan and partly in section on the line $x\ x'$ of Fig. 5, and Fig. 5 being a view, partly in front elevation and partly in section, on the line $y\ y'$ of Fig. 4.

A is the cross-head, B the connecting-rod, and C the crank-disk, of an ordinary engine. At some convenient point on the connecting-rod I attach a bracket, $b$. To this bracket, by nut and screw, is rigidly attached a small piston-head, G, having a hollow axis, which communicates by a continuous tube or duct, P, with the crank-pin through ducts in the brasses on the pin. It may be applied to one or both of the brasses. The periphery of the piston-head G is provided with a screw-thread. Over the piston-head and engaging with the screw-thread on the same fits a grease-cup, F, provided with a screw-thread on its interior and with gear-teeth or other suitable means on its exterior, preferably on its periphery, for engaging with corresponding suitable means for turning said cup and moving it down over the piston-head. These teeth on the exterior of the cup may be straight gear-teeth, spiral gear-teeth, or ratchet-teeth, according to the driving mechanism used. I have shown worm gear-teeth on the exterior of the cup and worm gear mechanism for driving the same; but other suitable mechanism may be employed.

J J' are small posts rigidly attached by nut and screw to the bracket $b$ parallel to the piston G.

H is a worm-shaft supported by the posts J J', and provided with worm-threaded sleeves $h$ and $h'$, which are made rigid with the shaft in any suitable way, as by pins, keys, or feathers, as $h''$, (shown in the drawings, Fig. 4,) there being a corresponding pin (not shown) fastening the sleeve $h'$, for engaging the worm gear-teeth on the cups F F'.

K is a ratchet-wheel rigidly attached to the worm-shaft.

N is a pawl-lever pivoted by a right-angled sleeve and bracket M to the worm-shaft H, and is provided with a pawl, $n$, for engaging the teeth of the ratchet-wheel K. Instead of being attached to the shaft H by a single right-angled bracket and a sleeve on one side of the ratchet-wheel, the pawl-lever may be bifurcated, with its arms inclosing the ratchet-wheel, and attached to the shaft by sleeves on opposite sides of the ratchet-wheel. The pawl $n$ is set in a recess, $m'$, of lever N, and is held in engagement with the ratchet-wheel by a spiral spring, $m''$.

To the pawl-lever N is pivotally attached, at one end, by an adjustable slide, $e$, and thumb-screw $e'$, a rod, E, which at its other extremity is pivotally attached to a post, D, rigidly connected at some convenient point to the cross-head A.

The post J' has a right-angled extension, $j$, at its top, overhanging the ratchet-wheel K. To this extension $j$ is attached, by screw $j''$, a flat spring, $j'$, provided with a hook on its free end for engaging the teeth and holding ratchet-wheel K.

L is a hand-lever attached to the worm-shaft H, for turning the same by hand when desired.

The posts J J' are attached by threaded ends and nuts to the bracket $b$, through transverse slots $i\ i'$. This is to permit lateral adjustment of the shaft H, and enable the grease-cups to be removed by hand when desirable for refilling or otherwise.

The operation of the device is as follows: The cups F F', containing grease or other heavy lubricant, being in position over the pistons G, and attached thereto by their interior screw-threads, may be forced down over the pistons by motion communicated through the worm-shaft H. Motion is given to this worm-shaft, through ratchet-wheel K, pawl-lever N, and rod E, by the difference in motion between the cross-head A and the connecting-rod B, or, in other words, by the oscillating or pendulum-like motion of the connecting-rod B. The cross-head A has a motion of reciprocation forward and backward only. The connecting-rod B has, in addition, a pendulum movement in the arc of a circle, the point of suspension being the pivotal connection with the cross-head and the length of the arc being determined by the position of the crank-pin in the crank-disk C. The post D, attached rigidly to cross-head A, is therefore a fixed part of the engine with reference to the pendulum motion of the connecting-rod B, and the pawl-lever N, being connected through rod E with this fixed portion, must have a rocking motion imparted thereto by the pendulum motion of the connecting-rod B. This rocking motion of lever N, through pawl $n$ and ratchet-wheel K, will impart a rotary motion to worm-shaft H, which in turn, through the worm-gear $h\ h'$ and worm gear-teeth on the periphery of the grease-cups, will screw the cups down over the pistons G and force the lubricant through the tubes P and through the ducts in the brasses to the crank-pin. The position of the pawl-lever N in the two extreme positions of the connecting-rod in its pendulum movement are shown, the one in full line and the other in dotted lines in Fig. 2.

The rapidity of the feed, and thereby the quantity of lubricants supplied to the crank-pin, may be varied at will by varying the length of throw of the pawl-lever N through slide $e$ and thumb-screw $e'$.

In Figs. 1, 2, and 3 I have shown one grease-cup in position for use, and in Figs. 4 and 5 I have shown two cups. The principle is identical in both cases.

I have shown and described my device as applied for lubricating the crank-pin of an ordinary vertical or horizontal engine. It will be understood that it is equally applicable to other kinds of engines, and generally to all kinds of moving machinery wherever advantage can be taken of the difference in motion between two moving parts; or a motion of oscillation or reciprocation can be converted into a rocking motion by pivoting the rod E to some part of the engine fixed with reference to the moving part carrying the oil-cup—as, for example, it could be applied to a beam-engine by pivoting the rod E through post D to the walking-beam. The difference in the degree of oscillation or length of arcs described by the connecting-rod and the walking-beam would be sufficient to give the requisite rocking motion to the pawl-lever N. It could be readily applied to the cross-head pin of an ordinary engine by attaching D to one of the fixed guides, and extending E at right angles to D by a rigid connection therewith, so that it would overhang the cross-head. By reversing the attachment my device may be as well used for lubricating a fixed part of the engine. In that case the lubricator will be attached to the fixed part and motion communicated to the movable part of the lubricator from a moving part of the engine.

Instead of having the piston of the lubricator fixed and the cup movable over the head of the piston, I may reverse the construction and have the cup fixed with a tube or duct leading from the cup to the part to be lubricated and have the piston movable within the cup. In that case I would have teeth of some kind, or other suitable means, on the exterior of the piston-rod for engaging with corresponding suitable mechanism for driving the same. The essential thing is that there shall be a grease-cup and a piston-head within the cup, one part being fixed and the other movable, a grease-duct leading from the reservoir of grease within the cup to the part to be lubricated, and positive mechanism of some kind for communicating motion to the movable part, whereby the movable part of the lubricator is moved toward the fixed part and the grease is forced positively and continuously to the point where it is needed. It will be readily understood that the mechanism for imparting this required motion to the movable part of the lubricator may be varied, admitting of a number of modifications. For example, the worm-shaft and worm may be hollowed out to suit the circle of the periphery of the movable part, in order to give a longer reach on the movable part; or a spur-gear may be placed intermediate the worm and the movable part, engaging with each; or the movable part may have ratchet-teeth on its periphery and a pawl may be made to move across the axis of the same, engaging with the teeth thereon; or a rack may be made to move across the axis of the movable part, engaging the teeth thereon, and be thrown in and out of gear therewith, when required, by a cam or equivalent device; or the hand-lever L may have teeth thereon and be moved by coming in contact at definite intervals with some part of the frame or attachment thereto or some moving part of the machinery, according as and reversely as L is supported on a fixed or moving part. The particular mechanism shown in the accompanying drawings, and hereinbefore described, is, however, my preferred construction.

On the various modifications herein described and not herein specifically claimed I reserve the right to make application for Letters Patent in subsequent applications.

What I claim, and desire to secure by Letters Patent, in this application is as follows:

1. In combination, a fixed piston-head provided with a continuous grease-duct to the point to be lubricated, a grease-cup provided with a screw-thread on its interior, engaging a screw-thread on said piston-head, and with gear-teeth on its exterior, and driving mechanism engaging the gear-teeth on said grease-cup and communicating with a source of motion, substantially as and for the purpose described.

2. In combination, a fixed piston-head provided with a continuous grease-duct to the point to be lubricated, a grease-cup provided with a screw-thread on its interior, engaging a screw-thread on said piston-head, and with gear-teeth on its exterior, a worm-shaft provided with a worm-thread engaging the gear-teeth on said grease-cup, and means for rotating said worm-shaft, substantially as described, for the purpose set forth.

3. In combination, a fixed piston-head with grease-delivering duct, as described, a grease-cup movable over said piston-head, as described, a worm-shaft with worm-thread engaging worm gear-teeth on said grease-cup, as described, a ratchet-wheel rigid with said worm-shaft, a pawl-lever with pawl engaging the teeth on said ratchet-wheel, and means for imparting a rocking motion to said pawl-lever, substantially as described, for the purpose set forth.

4. In combination, a supporting-bracket rigidly attached to the connecting-rod of an engine, a piston-head fixed in said bracket and provided with grease-delivering duct leading to the crank-pin, a grease-cup movable over said piston-head, a worm-shaft supported by posts fixed in said bracket and gearing with teeth on said grease-cup, a ratchet-wheel rigid with said worm-shaft, a pawl-lever pivoted on said worm-shaft and provided with a pawl engaging the teeth of said ratchet-wheel, and a rod pivotally connected at one end to the pawl-lever and at the other to a post rigidly attached to the cross-head, whereby the pendulum motion of the connecting-rod with reference to the cross-head will impart a rocking motion to the pawl-lever and through the connected mechanism force the lubricant to the crank-pin, as described.

5. In combination, connecting-rod B, bracket $b$, attached to said connecting-rod, piston G, as described, grease-cup F, as described, worm-shaft H, provided with worm-thread, as described, ratchet-wheel K, pawl-lever N, provided with spring-pawl $n$, adjustable slide $e$, rod E, post D, and cross-head A, all substantially as described, for the purpose set forth.

TREVANION WILLIAM HUGO.

In presence of—
H. A. STARKEY,
CHAS. J. DAHL.